United States Patent
Mori

(10) Patent No.: US 8,797,560 B2
(45) Date of Patent: Aug. 5, 2014

(54) IMAGE FORMING APPARATUS, IMAGE FORMING METHOD, AND STORAGE MEDIUM

(75) Inventor: Hiroshi Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/399,919

(22) Filed: Feb. 17, 2012

(65) Prior Publication Data

US 2012/0218582 A1 Aug. 30, 2012

(30) Foreign Application Priority Data

Feb. 25, 2011 (JP) .................................. 2011-040519

(51) Int. Cl.
*G06F 3/12* (2006.01)
*G06K 15/10* (2006.01)
*G06K 15/00* (2006.01)

(52) U.S. Cl.
USPC ............. 358/1.13; 358/1.8; 358/1.9; 358/2.1; 358/3.3; 358/3.13

(58) Field of Classification Search
None
See application file for complete search history.

(56) References Cited

U.S. PATENT DOCUMENTS

| | | | |
|---|---|---|---|
| 2005/0213157 A1* | 9/2005 | Ho .............................. | 358/3.03 |
| 2006/0087699 A1* | 4/2006 | Matsuhira .................... | 358/448 |
| 2007/0159476 A1* | 7/2007 | Grasnick ...................... | 345/419 |
| 2008/0218803 A1* | 9/2008 | Murakami ................... | 358/3.01 |
| 2008/0297838 A1* | 12/2008 | Matsui et al. ................. | 358/1.15 |
| 2009/0244565 A1* | 10/2009 | Yomogisawa ................ | 358/1.9 |
| 2009/0284777 A1* | 11/2009 | Imai ............................. | 358/1.11 |
| 2009/0324068 A1* | 12/2009 | Yamakawa ................... | 382/165 |
| 2010/0260432 A1* | 10/2010 | Shimizu et al. .............. | 382/255 |
| 2011/0273729 A1* | 11/2011 | Tanase et al. ................. | 358/1.8 |

FOREIGN PATENT DOCUMENTS

JP 2006-048172 A 2/2006

* cited by examiner

*Primary Examiner* — Satwant Singh
(74) *Attorney, Agent, or Firm* — Canon USA Inc IP Division

(57) ABSTRACT

An image forming apparatus acquires a drawing object included in a page in which drawing is to be performed, updates a threshold value, which is used when one of mask drawing and edge drawing is selected to draw the drawing object according to a relationship between the acquired drawing object and another drawing object included in the page, selects, as a drawing method, one of the mask drawing and the edge drawing to draw the drawing object based on the updated threshold value and the acquired drawing object, and draws the acquired drawing object by the selected drawing method.

17 Claims, 15 Drawing Sheets

FIG. 7

| THRESHOLD VALUE ID | COEFFICIENT 1 | COEFFICIENT 2 | |
|---|---|---|---|
| THRESHOLD VALUE 1 | A₁ | B₁ | ← 701 MASK/EDGE THRESHOLD VALUE 1 |
| THRESHOLD VALUE 2 | A₂ | B₂ | ← 702 MASK/EDGE THRESHOLD VALUE 2 |
| THRESHOLD VALUE 3 | A₃ | B₃ | ← 703 MASK/EDGE THRESHOLD VALUE 3 |
| THRESHOLD VALUE 4 | A₄ | B₄ | ← 704 MASK/EDGE THRESHOLD VALUE 4 |
| THRESHOLD VALUE 5 | A₅ | B₅ | ← 705 MASK/EDGE THRESHOLD VALUE 5 |

MASK/EDGE THRESHOLD VALUE TABLE

| OBJECT ID | OBJECT INFORMATION | FILLING INFORMATION |
|---|---|---|
| 1 | OBJECT INFORMATION 1 ~1501 | FILLING INFORMATION 1 ~1504 |
| 2 | OBJECT INFORMATION 2 ~1502 | FILLING INFORMATION 2 ~1505 |
| ... | ... | ... |
| N | OBJECT INFORMATION N ~1503 | FILLING INFORMATION N ~1506 |

1500

OBJECT TABLE

IMAGE FORMING APPARATUS, IMAGE FORMING METHOD, AND STORAGE MEDIUM

BACKGROUND OF THE INVENTION

1. Field of the Invention

The present invention relates to an image forming apparatus, a drawing method, and a storage medium.

2. Description of the Related Art

In recent years, along with enhanced drawing functions of various applications and devices operating on a client personal computer (PC), printers have also become capable of drawing using various drawing functions. In particular, to draw conventional text information or rectangular information, even when the same image is drawn, various drawing methods can be used including a drawing method using mask data with a raster operation (ROP) and a drawing method using vector information.

For example, when an object "1" 201 included in a page 200 as illustrated in FIG. 1 is drawn, as indicated as "mask drawing", an image is drawn using filling information 202 and mask information 203 specifying the ROP function. The mask information 203 includes information indicating "on" or "off". A background (background color (white) on the page here) is selected for a coordinate position of "off". An ROP instruction for disposing a color of filling information 202 is given for the coordinate position of "on". The image forming apparatus realizes the drawing of the object "1" 201 by selecting "on" or "off" for each coordinate position.

Further, as indicated as "edge drawing", the image forming apparatus can perform drawing using the filling information 202 and edge information 204. By a drawing method of filling a region defined by arrows, such as the edge information 204, with the filling information 202, drawing of the object "1" 201 can be also realized.

Japanese Patent Application Laid-Open No. 2006-048172 discusses a technique for selecting a drawing method depending on a threshold value of the number of predetermined passes provided in advance. The drawing method to be selected for each object includes a method of drawing using the ROP function and the mask information 203 and a method of drawing using the filling information 202 and the edge information 204. Such a technique is discussed for realizing drawing by an optimum drawing method using selection processing.

However, when the selection is determined only with the predetermined threshold value as described above, the threshold value may not be optimum depending on a relationship with other objects, and may cause a deterioration in performance. For example, as illustrated in FIG. 2, a case for drawing a drawing position 303 in a page 300 including an object "2" 301 overlapping an image 302 will be described. When the object "2" 301 is drawn by the mask drawing, preparation processing for color information about the object "2" 301 needs to be performed seven times, for example. Further, the preparation processing for the color information about the image 302 also needs to be performed seven times.

On the other hand, when the object "1" 201 is drawn, the preparation processing for the color information about the object "1" 201 needs to be performed seven times, for example. Since the color information about the page 200 is single-color filling information, the preparation processing for the color information thereabout is completed with only one time performance. Therefore, when the mask drawing is performed, a load necessary for the mask drawing varies depending on whether a drawing object on which the mask drawing is performed is related to other objects.

SUMMARY OF THE INVENTION

The present disclosure is directed to an improvement of a drawing speed, among other things.

According to an aspect of the present disclosure, an image forming apparatus includes an acquisition unit configured to acquire a drawing object included in a page in which drawing is to be performed, an updating unit configured to update a threshold value, which is used when one of mask drawing and edge drawing is selected to draw the drawing object, depending on a relationship between the drawing object acquired by the acquisition unit and another drawing object included in the page, a selection unit configured to select, as a drawing method, one of the mask drawing and the edge drawing to draw the drawing object based on the threshold value updated by the updating unit and the drawing object acquired by the acquisition unit, and a drawing unit configured to draw the drawing object acquired by the acquisition unit by the drawing method selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles discussed herein.

FIG. 7 illustrates a detailed example of mask/edge threshold values including a coefficient 1 and a coefficient 2.

FIG. 8 illustrates a detailed example of a object information list treated in the mask/edge threshold value determination processing in step S501.

DESCRIPTION OF THE EMBODIMENTS

Various exemplary embodiments, features, and aspects will be described in detail below with reference to the drawings.

An exemplary embodiment of the present disclosure will be described using a multifunction peripheral (MFP) as an example of an image forming processing apparatus 100. The image forming processing apparatus may be a single function peripheral (SFP), a laser beam printer (LBP), or a printer of another print method.

Figure 3:
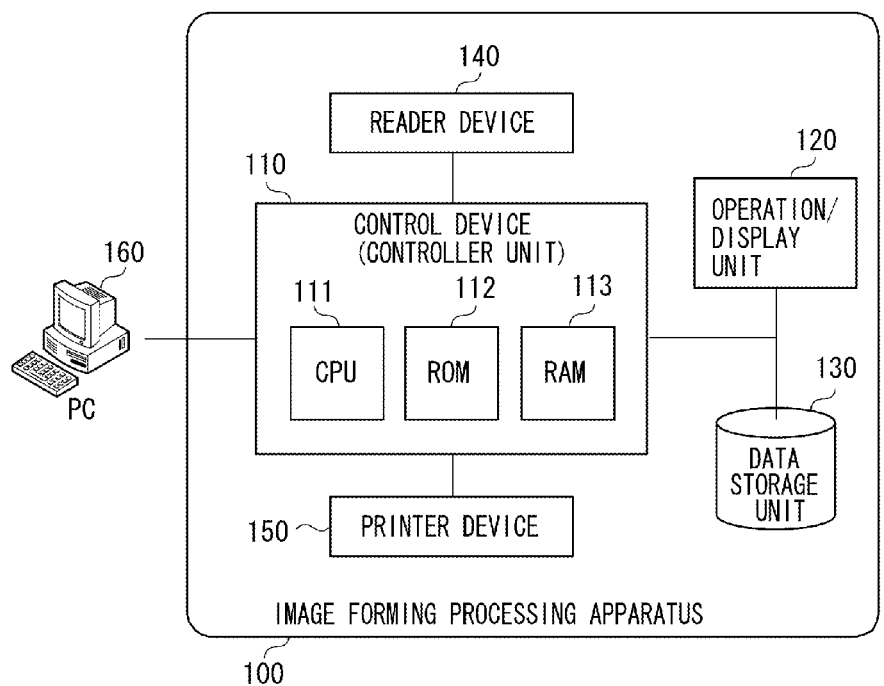
FIG. 3 illustrates an example of an image forming processing apparatus.

FIG. 3 illustrates an example of an image forming processing apparatus. The image forming processing apparatus 100 is connected to a host computer (PC) 160 via a local area network (LAN). The image forming processing apparatus 100 includes a reader device 140, a printer device 150, an operation/display unit 120, a data storage unit 130, and a control device (controller unit 110) that controls each configuration component.

The control device 110 includes a central processing unit (CPU) 111, a read only memory (ROM) 112, and a random access memory (RAM) 113. The CPU 111 overall controls the image forming processing apparatus 100 based on a program stored in the ROM 112 or another storage medium. For example, the controller 110 loads into the CPU 111 a program previously determined to perform PDL analysis processing, intermediate language generation processing, and rendering processing.

The rendering processing is not described herein, and may use a special hardware. The printer device 150 outputs image data. The operation/display unit 120 includes a keyboard for operating each print setting to perform image output processing and a liquid crystal panel for displaying operation buttons for performing image output setting.

The data storage unit 130 can store/preserve image data, document data, and print data including print device control language (e.g., escape sequence (ESC) code, page-description language (PDL)). For example, the data storage unit 130 can store/preserve image data, documents, and PDL data received from the host computer (PC) 160 via the LAN, and image data read by controlling the reader device 140.

In other words, the CPU 111 executes processing based on the program to realize the processing of the flowcharts described below. According to the present exemplary embodiment, the CPU 111 performs processing based on the program. However, a special hardware may execute all processing or a part of processing to be executed by the CPU 111.

Figure 4:
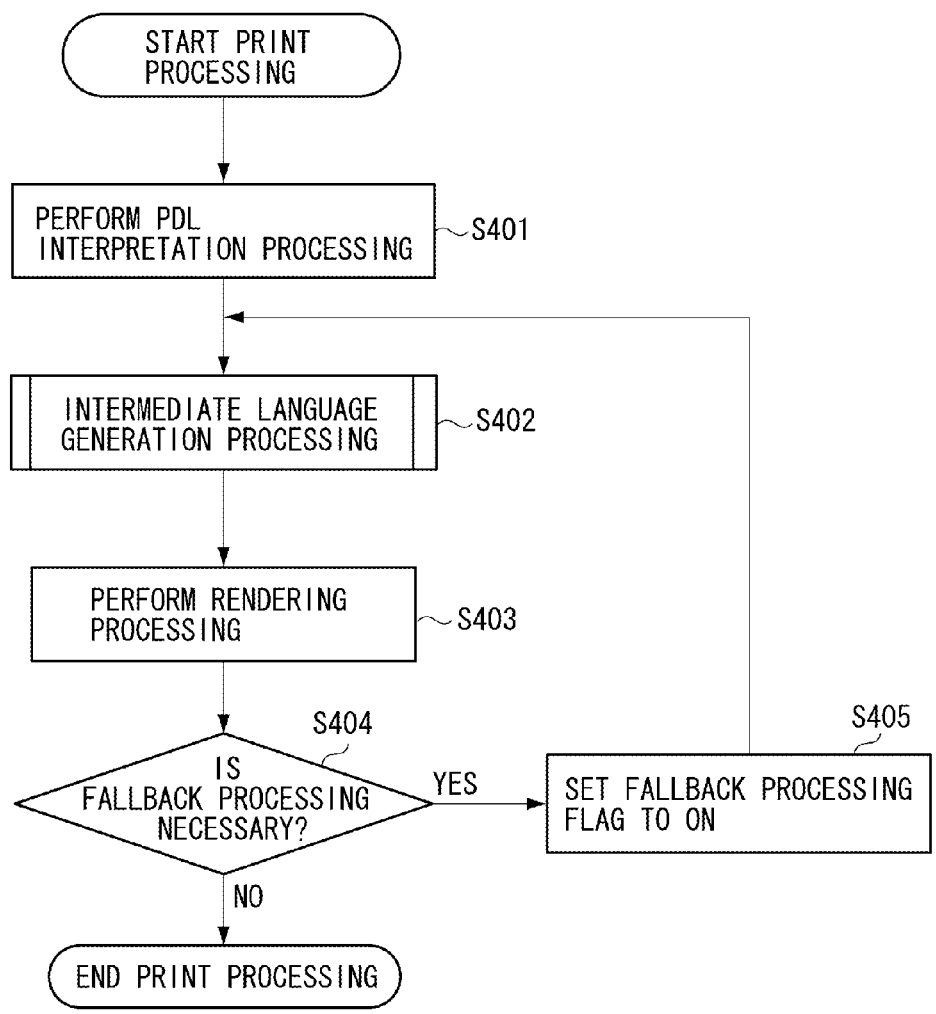
FIG. 4 is a flowchart illustrating an example of image forming processing performed on a page image according to a first exemplary embodiment of the present invention.

FIG. 4 is a flowchart illustrating an example of image forming processing performed on a page image according to a first exemplary embodiment of the present invention.

First, a print instruction of page image information indicated with the PDL is forwarded from the PC 160. The image forming processing apparatus 100 stores the forwarded PDL into the data storage unit 130. In step S401, to perform image-generation processing, the CPU 111 acquires the PDL from the data storage unit 130, and performs analysis processing. In step S402, the CPU 111 performs predetermined generation processing of intermediate language that can be rendered from the analyzed PDL. In step S403, the CPU 111 performs the rendering processing based on the intermediate language generated in step S402, and generates bitmap data indicating the page image.

In step S404, the CPU 111 determines whether the PDL data to be processed needs fallback processing. Details of the fallback processing will be described below with reference to FIG. 9. In step S506 included in step S402, the CPU 111 determines whether the fallback processing is necessary by the intermediate language processing. The CPU 111 determines whether a free memory necessary for generating the intermediate language is available every time an object is processed in steps S804, S805, and S806. At a time point of detecting memory depletion during the processing in step S806, the CPU 111 determines that the fallback processing is necessary.

Further, when the fallback processing is necessary, the CPU 111 sets special flag information. Based on this flag information, the CPU 111 determines whether the fallback processing is being processed. Details thereof will be described below. When the CPU 111 determines that the fallback processing is necessary (YES in step S404), the processing proceeds to step S405. When the CPU 111 determines that the fallback processing is not necessary (NO in step S404), the print processing ends.

Figure 5:
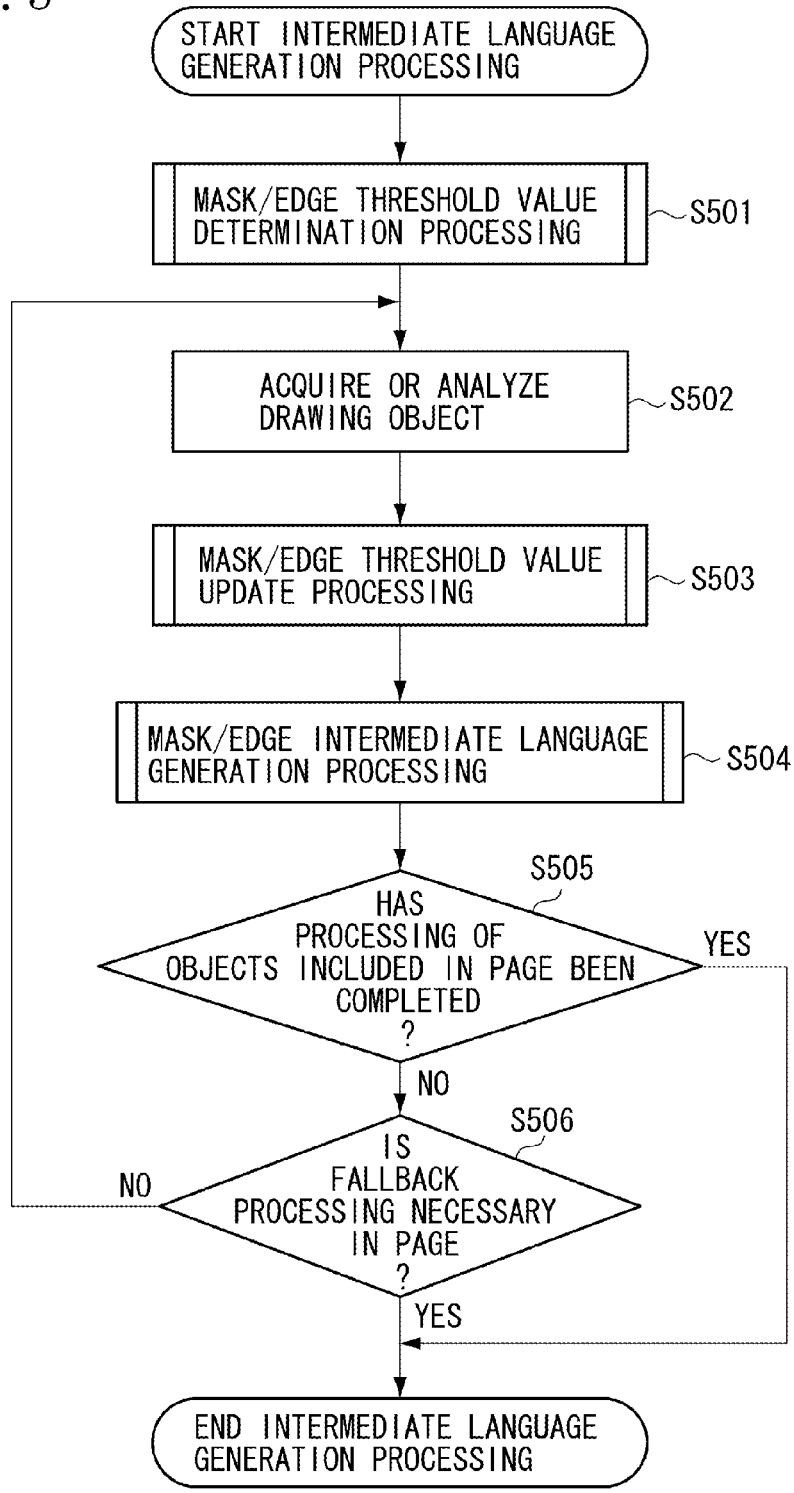
FIG. 5 is a flowchart illustrating a detailed example of intermediate language generation processing in step S402.

FIG. 5 is a flowchart illustrating a detailed example of the intermediate language generation processing step in step S402.

In step S501, in the intermediate language generation processing in step S402, the CPU 111 first performs processing for determining an initial value of a mask/edge threshold value according to setting information for performing the drawing. The determination processing of the initial value of the mask/edge threshold value will be described in detail below. In step S502, the CPU 111 performs processing for acquiring a drawing object included in the page and analyzing drawing information related to the drawing object. A mask/edge threshold value is one of the examples of a threshold value which is used when one of a mask drawing and an edge drawing is selected to draw the drawing object depending on a relationship between an acquired drawing object and another drawing object included in the page. In step S503, according to an analysis result of the drawing information acquired in step S502, the CPU 111 performs processing for determining whether the initial value of the mask/edge threshold value determined in S501 needs to be updated.

When it is determined that the updating is necessary, the initial value is updated to the threshold value described below. When it is determined that the updating is not necessary, the intermediate language generation processing continues with the mask/edge threshold value currently set. Details of the mask edge threshold value update processing will be described below. Based on the mask/edge threshold value determined in steps S501 and S503, the CPU 111 determines which of the mask drawing and the edge drawing is capable of faster processing. In step S504, according to the determination result, the CPU 111 performs the generation processing of the intermediate language for instructing the mask drawing or the edge drawing. The processing for determining which of the mask drawing and the edge drawing is capable of faster processing is performed using the following expression (1).

$$(\text{Width} \times \text{Height}) < \text{Coefficient 1} \times \text{Number of Edges} + \text{Coefficient 2} \quad (1)$$

The "Width" described above refers to a width of the object. The "Height" described above refers to a height of the object. The "Number of Edges" described above refers to a number of edges of the object.

When the determination described above is "TRUE", the CPU 111 determines that the mask drawing is the faster one and then generates the intermediate language using the mask drawing. Further, when the determination is "FALSE", the CPU 111 determines that the edge drawing is the faster one and then generates the intermediate language using the edge drawing. The coefficients 1 and 2 have been previously retained in the data storage unit 130 as table information, for example. The CPU 111 selects an appropriate threshold value according to each determination processing described below, and performs the intermediate language generation processing.

In step S505, the CPU 111 determines whether the drawing processing of the object included in the page has been completed. When it is determined to be completed (YES in step S505), the CPU 111 ends the intermediate language generation processing in step S402. When it is not determined to be completed (NO in step S505), the CPU 111 proceeds to step S506. In step S506, the CPU 111 determines whether the page needs the fallback processing. As for the determination of the fallback processing, when the total size of the generated intermediate language exceeds a capacity previously allocated to the data storage unit 130, the fallback processing is necessary. Thus, the CPU 111 determines that the fallback processing is necessary (YES in step S506). When it does not exceed the capacity, the CPU 111 determines that the fallback processing is not necessary (NO in step S06), and the processing then returns to step S502 to continue a series of processing.

Figure 6:
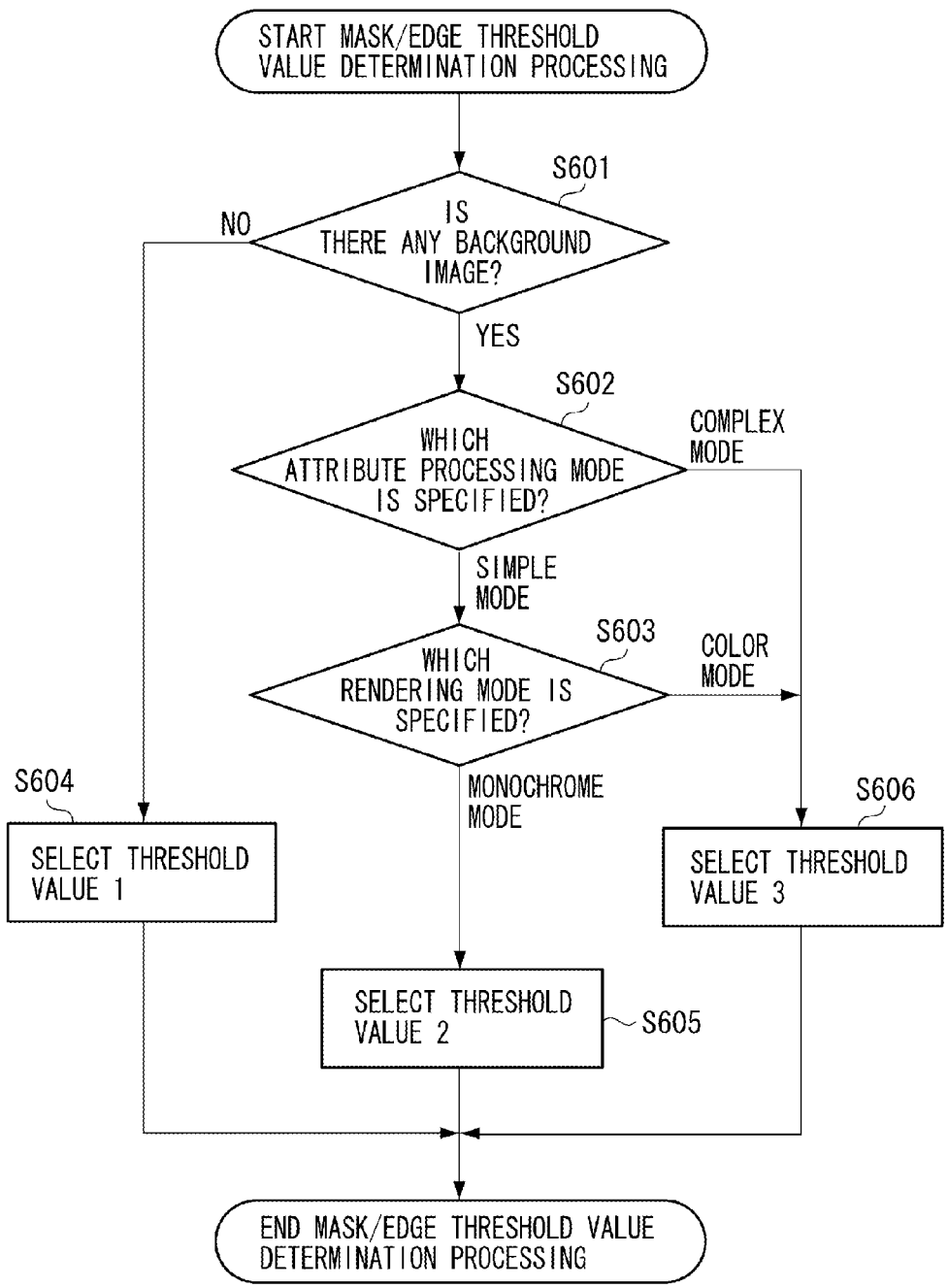
FIG. 6 is a flowchart illustrating a detailed example of mask/edge threshold value determination processing in step S501.

FIG. 6 is a flowchart illustrating a detailed example of the mask/edge threshold value determination processing in step S501. FIG. 7 is a detailed example of the mask edge threshold values 701 to 705 including the coefficient 1 and the coefficient 2. FIG. 8 illustrates a detailed example of an object information list treated in the mask/edge threshold value determination processing in step S501.

In step S601, first, the CPU 111 determines whether there is any background image to be drawn over a whole page in the page. When there is a background image (YES in step S601), the CPU 111 proceeds to step S602. When there is no background image (NO in step S601), the CPU 111 proceeds to step S604. Further, as a method of the determination, for example, the CPU 111 performs the determination based on flag information indicating whether the fallback processing was performed on the page the previous time. Details thereof will be described below. According to the processing of the present exemplary embodiment, when the fallback processing is performed, a background image is always included.

Therefore, by the flag information about whether the fallback processing was performed on the page, the CPU 111 can determine whether a background image is included. The CPU 111 determines whether the load of the mask drawing is large or small depending on whether a background is included. Furthermore, as another example of determining whether a background image is included, the CPU 111 determines the background image is included based on an object list 1500 of object information retained in the CPU 111.

For example, the CPU 111 performs the generation processing of the intermediate language based on the object list 1500 stored in the data storage unit 130. The object list 1500 includes object information 1501, 1502, and 1503, and object filling information (single-color painting/image painting) 1504, and 1505, 1506. Therefore, the CPU 111 determines whether there is any background by searching the filling information 1504, 1505, and 1506 stored in the object list 1500 and analyzing information about the width and the height included in the filling information 1504, 1505, and 1506. For example, when there is an image having a larger width and height than those of a predetermined size, the CPU 111 determines that there is a background image.

In step S602, the CPU 111 determines the specification of an attribute processing mode to be used for page drawing. When a complex operational mode (COMPLEX MODE in step S602) is specified for the attribute processing mode, the CPU 111 proceeds to step S606. When a simple operation mode (SIMPLE MODE in step S602) is specified for the attribute processing mode, the CPU 111 proceeds to step S603. The attribute processing refers to processing for calculating an output result of an attribute value when the object of the background and the object disposed thereon are combined with each other. In the present exemplary embodiment, a plurality of attribute processing methods that have been conventionally discussed can be switched. For example, as an example of the attribute processing that has been conventionally discussed, as with the expression (2) below, a method for performing a simple calculation of the attributes has been discussed.

$$\text{Attribute value(Result)} = \text{Attribute value(Background)} \& \text{Attribute value(Foreground)} \quad (2)$$

In the above-described equation, each bit of the attribute value includes each implication, and processing is expressed for deleting the bit having unnecessary implication every time the combination is performed. Since the equation performs a simple AND (i.e. "&") operation, the processing can be comparatively simply performed. Further, as another example of the attribute processing, as with the equation (3) below, the processing for calculating the result of the attribute value from the analysis of a combination method has been discussed.

$$\text{Attribute value(Result)} = (\text{Combination method analysis result} == \text{Background})?\text{Attribute value(Background)}: \text{Attribute value(Foreground)} \quad (3)$$

In the above-described equation, the selection processing of the result of the attribute value is performed by analyzing a combination of various parameters. There is a plurality of parameters to be analyzed, and complex combinations will be analyzed, and thus it is time consuming. Therefore, it will be comparatively complex processing. As described above, the attribute processing includes a simple mode and a complex mode. Therefore, by the processing in step S602, an optimum conversion can be performed in the mask drawing, which generates a different load for each pixel.

In step S603, the CPU 111 determines which of a color mode and a monochrome mode is used for a rendering mode. When the color mode is specified for the rendering mode (COLOR MODE in step S603), the CPU 111 proceeds to step S606. When the monochrome mode is specified for the rendering mode (MONOCHROME MODE in step S603), the CPU 111 proceeds to step S605.

With this specification, according to the rendering mode, an optimum conversion can be performed in the mask drawing, which generates a different load for each pixel. Insteps S604 to S606, according to the determination results in steps S601 to S603, the CPU 111 determines the initial values of the above-mentioned mask/edge threshold values 701 to 705 in a threshold value table 700. Each threshold value retains the coefficient 1 and the coefficient 2 previously determined according to a threshold value ID as illustrated in FIG. 7, and the data storage unit 130 retains this table. A predetermined value is determined for each of the threshold value 1, the threshold value 2, and the threshold value 3, and the threshold value includes a coefficient facilitating the mask drawing in the order of threshold value 1>threshold value 2>threshold value 3. Accordingly, the threshold value 1 facilitates the mask drawing most, and the threshold value 3 facilitates the edge drawing most.

Figure 9:
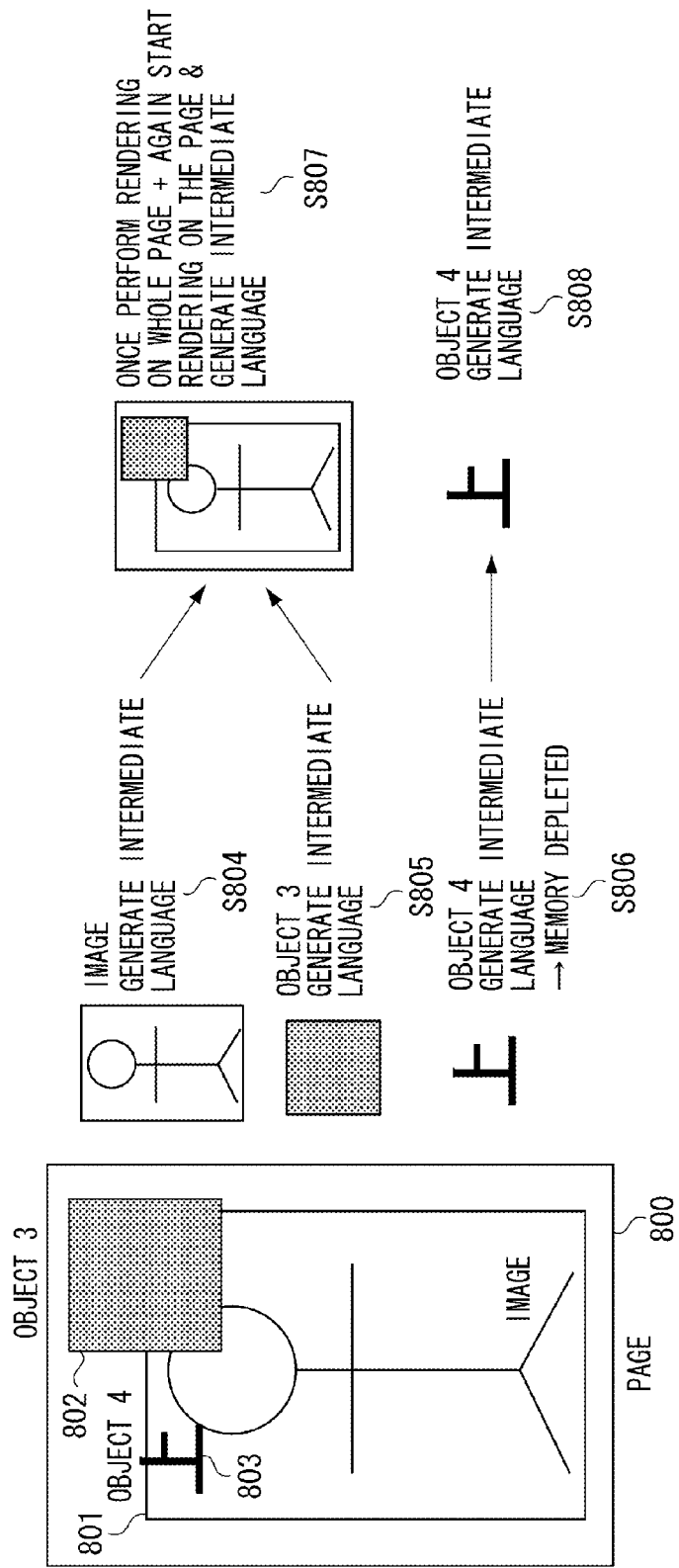
FIG. 9 illustrates an outline of fallback processing determined when processing for determining whether there is any background is performed in step S601.

FIG. 9 illustrates an outline of the fallback processing determined when processing for determining whether there is any background is performed in step S601.

For example, when an image 801, an object "3" 802 and an object "4" 803 are included in a page 800, the CPU 111 continues the intermediate language generation processing in steps S804 and S805. However, when the memory is depleted while the intermediate language generation processing is performed in step S806, the CPU 111 performs the rendering processing up to the intermediate language generation in step S805. With the processing described above, by converting the intermediate languages of a plurality of objects into one type of image data, a free memory space can be generated.

The CPU 111 performs the fallback processing when converting the data, and sets the special flag information indicating that the processing needs to be continued. When the rendering processing is completed, the CPU 111 detects that the fallback processing is necessary with reference to the special flag information described above. Subsequently, in step S807, the CPU 111 generates the intermediate language of an image disposed as the background. Finally, the CPU 111 realizes the printing processing on the page 800 by generating the intermediate language of the object "4" 808 and performing the rendering processing thereon.

Figure 10:
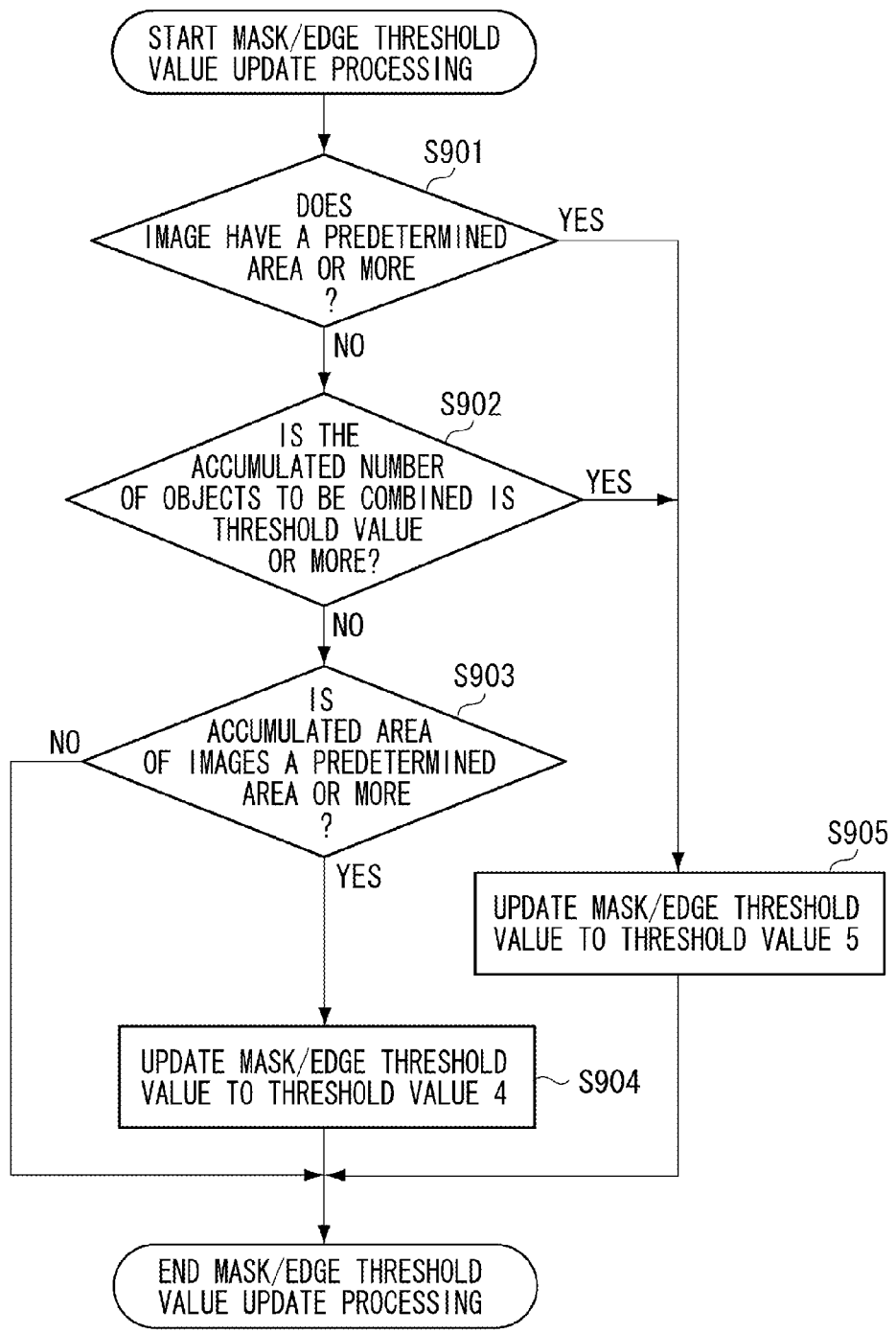
FIG. 10 is a flowchart illustrating a detailed example of mask/edge threshold value update processing in step S503.

FIG. 10 is a flowchart illustrating a detailed example of the mask/edge threshold value update processing in step S503.

In step S901, the CPU 111 determines whether the drawing object acquired in step S502 is an image having a predetermined area or more. The CPU 111 determines the area of the background image based on the object list 1500 described above. When the intermediate language is generated, the CPU 111 sequentially refers to items in the object list 1500 to generate each intermediate language. Therefore, the CPU 111 analyzes width and height information of the filling information 1504, 1505, and 1506 about the object targeted for the processing, and determines whether the area has a predetermined area or more.

Figure 1:
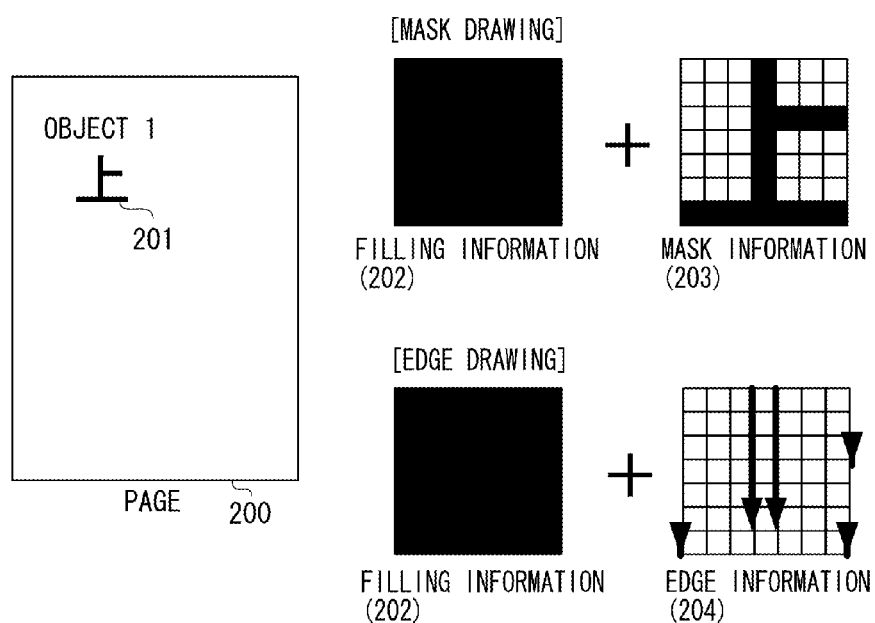
FIG. 1 illustrates an example of a conventional drawing method realizing mask drawing and edge drawing.
Figure 2:
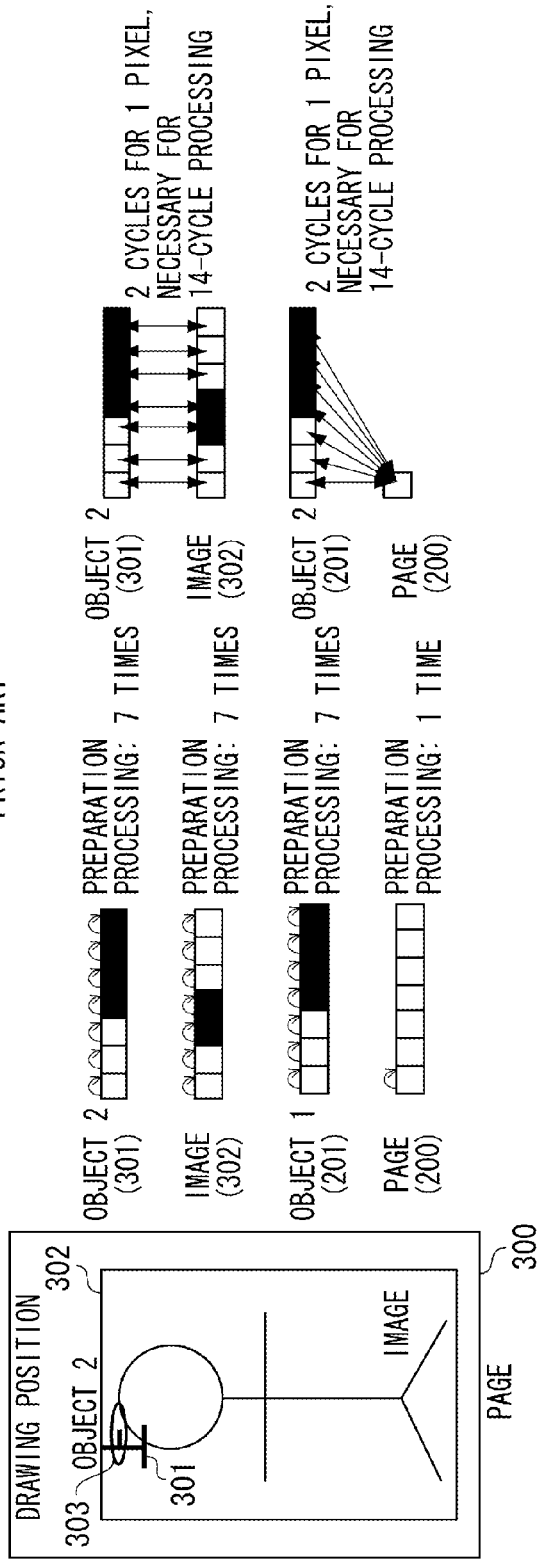
FIG. 2 illustrates an example of a problem to be solved in the mask drawing of the conventional drawing method.

When the image has the predetermined area or more, the CPU 111 determines that the image easily influences another object (due to increased preparation processing described with reference to FIG. 2). Therefore, when a condition described in step S901 is satisfied (YES in step S901), the CPU 111 proceeds to step S905, in which the CPU 111 updates the threshold value to the threshold value facilitating the edge drawing. When the condition described in step S901 is not satisfied (NO in step S901), the CPU 111 proceeds to step S902.

In step S902, the CPU 111 performs processing for determining whether the number of accumulated objects that need combining processing is a predetermined number of accumulated objects or more in the drawing object acquired in step S502. The CPU 111 discriminates ROP information related to each drawing object to determine whether the combining processing is necessary. Thus, when the number of objects that need the combining processing and are accumulated for each object exceeds the predetermined number (YES in step S902), the CPU 111 proceeds to step S905, in which the CPU 111 updates the threshold value to the threshold value facilitating the edge drawing. When the predetermined number of the accumulated objects has not exceeded yet (NO in step S902), the CPU 111 proceeds to step S903.

In step S903, the CPU 111 performs processing for determining whether the accumulated area of images including the drawing object acquired in step S502 exceeds a predetermined area. The CPU 111 accumulates (adds) each area of the images, and determines whether the accumulated area exceeds the predetermined area. When the CPU 111 determines that the accumulated area exceeds the predetermined area (YES in step S903), the CPU 111 proceeds to step S904. When the CPU 111 determines that the accumulated area does not exceed the predetermined area (NO in step S903), the CPU 111 ends the mask/edge threshold value update processing in step S503.

According to the determination result of steps S901 to S903, insteps S904 and S905, the CPU 111 updates the current threshold value to a new threshold value of the mask/edge threshold values 701 to 705 based on the threshold value table 700. Each threshold value retains the coefficient 1 and the coefficient 2 previously determined according to a threshold value ID as illustrated in FIG. 7, and the data storage unit 130 retains the table. A predetermined value is determined for each of the threshold value 4 and the threshold value 5, and the threshold value includes a coefficient facilitating the mask drawing in the order of threshold value 1>threshold value 4>threshold value 5. Accordingly, the threshold value 1 facilitates the mask drawing the most, and the threshold value 5 facilitates the edge drawing the most.

Figure 11:
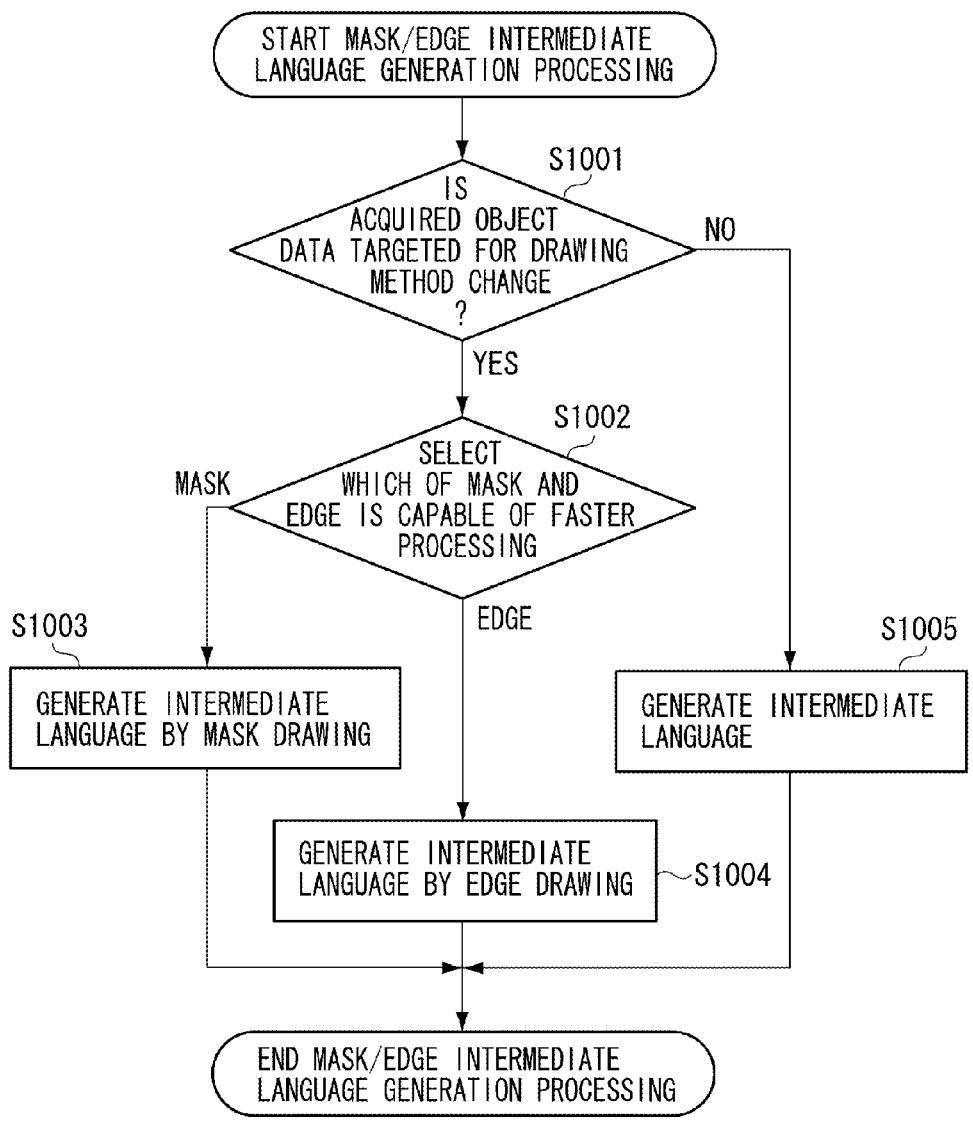
FIG. 11 is a flowchart illustrating a detailed example of mask/edge intermediate language generation processing in step S504.

FIG. 11 is a flowchart illustrating a detailed example of the mask/edge intermediate language generation processing in step S504.

First, in step S1001, the CPU 111 determines whether the drawing object acquired in step S502 is an object targeted for switching to the predetermined mask drawing or the predetermined edge drawing. The target data can be freely set, and may include, for example, character data, graphic data, and mask data. The CPU 111 can determine the character data, the graphic data, and the original mask data based on the attribute of the object.

Further, it is assumed to use a conventionally discussed technique for the mask data. Thus, the CPU 111 determines whether the mask data is to be used according to specification detection of combining the mask data and a predetermined code of the ROP3 for the combining processing, for example. Further, among predetermined codes of the ROP, a code (e.g., ROP code for a simple overwriting) that does not need the combining processing is not determined as the mask data herein. When the CPU 111 determines that the object acquired in step S502 is the predetermined target data (YES in step S1001), the processing proceeds to step S1002. When the CPU 111 determines that the object acquired in step S502 is not the predetermined target data (NO in step S1001), the processing proceeds to step S1005.

In step S1002, the CPU 111 determines which of the mask drawing and the edge drawing is capable of faster processing on the drawing object acquired in step S502. By the calculation using the above described expression 1 in step S504 illustrated in FIG. 5, which uses the mask/edge threshold value, the CPU 111 determines whether the condition is "TRUE" or "FALSE". When the above-described determination is "TRUE" ("MASK" in step S1002), the CPU 111 proceeds to step S1003. When the above-described determination is "FALSE" ("EDGE" in step S1002), the CPU 111 proceeds to step S1004.

When the determination is "TRUE" (YES in step S1002), then in step S1003, the CPU 111 performs generation processing of the intermediate language using the mask drawing on the drawing object acquired in step S502. When the determination is "FALSE" (NO in step S1002), then in step S1004, the CPU 111 performs generation processing of the intermediate language using the edge drawing on the drawing object acquired in step S502. Further, when the determination is "FALSE" (NO in step S1001), then in step S1005, the CPU 111 generates a conventional intermediate language. Steps S1003 and S1004 are an example of the drawing processing.

Points different from the first exemplary embodiment will be described in a second exemplary embodiment of the present invention.

Figure 12:
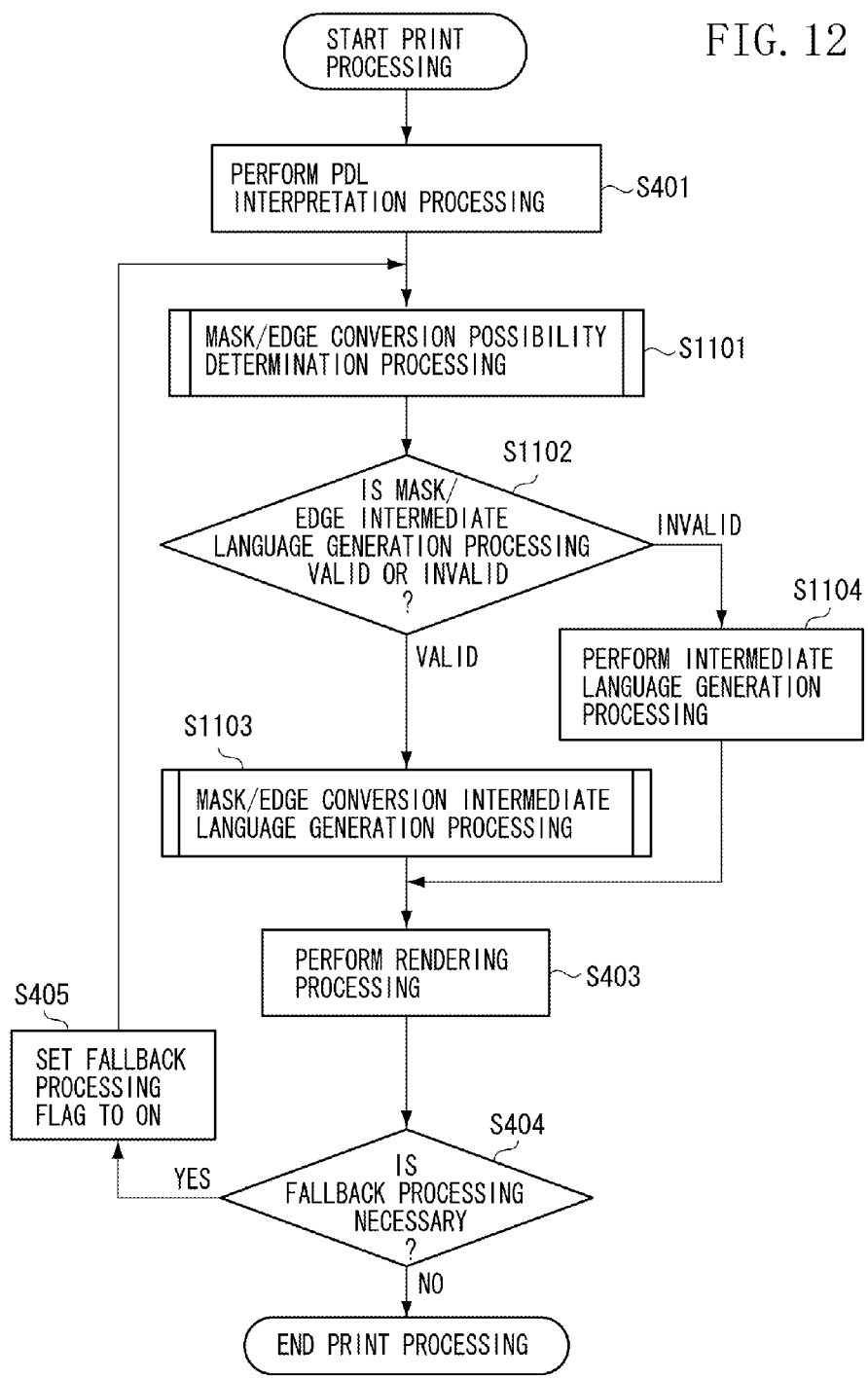
FIG. 12 is a flowchart illustrating an example of image forming processing performed on a page image according to a second exemplary embodiment of the present invention.

FIG. 12 is a flowchart illustrating an example of image forming processing performed on a page image according to the second exemplary embodiment of the present invention.

First, the print instruction of page image information represented by the PDL is forwarded from the PC 160. The image forming processing apparatus 100 stores the forwarded PDL in the data storage unit 130. To perform the generation processing on the image, in step S401, the CPU 111 acquires the PDL from the data storage unit 130, and then performs analysis processing.

In step S1101, the CPU 111 performs processing for, based on each parameter, determining whether to validate mask/edge intermediate language generation processing to perform the intermediate language generation processing. Details thereof will be described below. In step S1102, based on the determination result in step S1101, the CPU 111 performs processing for selecting "VALID" or "INVALID" of the mask/edge intermediate language generation processing. When the mask/edge intermediate language generation processing is determined to be "VALID" in step S1102, the CPU 111 proceeds to step S1103. When the mask/edge intermediate language generation processing is determined to be "INVALID" in step S1102, the CPU 111 proceeds to step S1104.

When the mask/edge intermediate language generation processing is determined to be "VALID" in step S1101, then in step S1103, the CPU 111 performs the mask/edge conversion intermediate language generation processing. Details thereof will be described below. Further, when the mask/edge intermediate language generation processing is determined to be "INVALID" in step S1101, then in step S1104, the CPU 111 performs conventional intermediate language generation processing without performing the mask/edge intermediate language generation processing. In step S403, based on the intermediate language generated in step S1103 or S1104, the CPU 111 performs the rendering processing to generate bitmap data representing an image in the page.

In step S404, the CPU 111 determines whether the PDL data to be processed needs the fallback processing. FIG. 9 illustrates details of the fallback processing, and the CPU 111 determines whether the fallback processing is necessary by the processing performed in step S1307 included in the intermediate language generation processing in step S1103 and the processing performed in step S1104. The CPU 111 determines whether the free memory necessary for generating the intermediate language is available every time an object is processed in steps S804, S805, and S806. At a time point of detecting memory depletion during the processing in step S806, the CPU determines that the fallback processing is necessary.

Further, when the fallback processing is necessary (YES in step S404), the CPU 111 sets the special flag information to determine whether the fallback processing is subsequently processed. When the CPU 111 determines that the fallback processing is necessary, the processing proceeds to step S405, in which the CPU 111 sets the flag indicating that the fallback processing has been performed and then continues the processing from step S1101. Furthermore, when the CPU 111 determines that the fallback processing is not necessary (NO in step S404), the print processing ends. The details of the fallback processing are as described as above.

Figure 13:
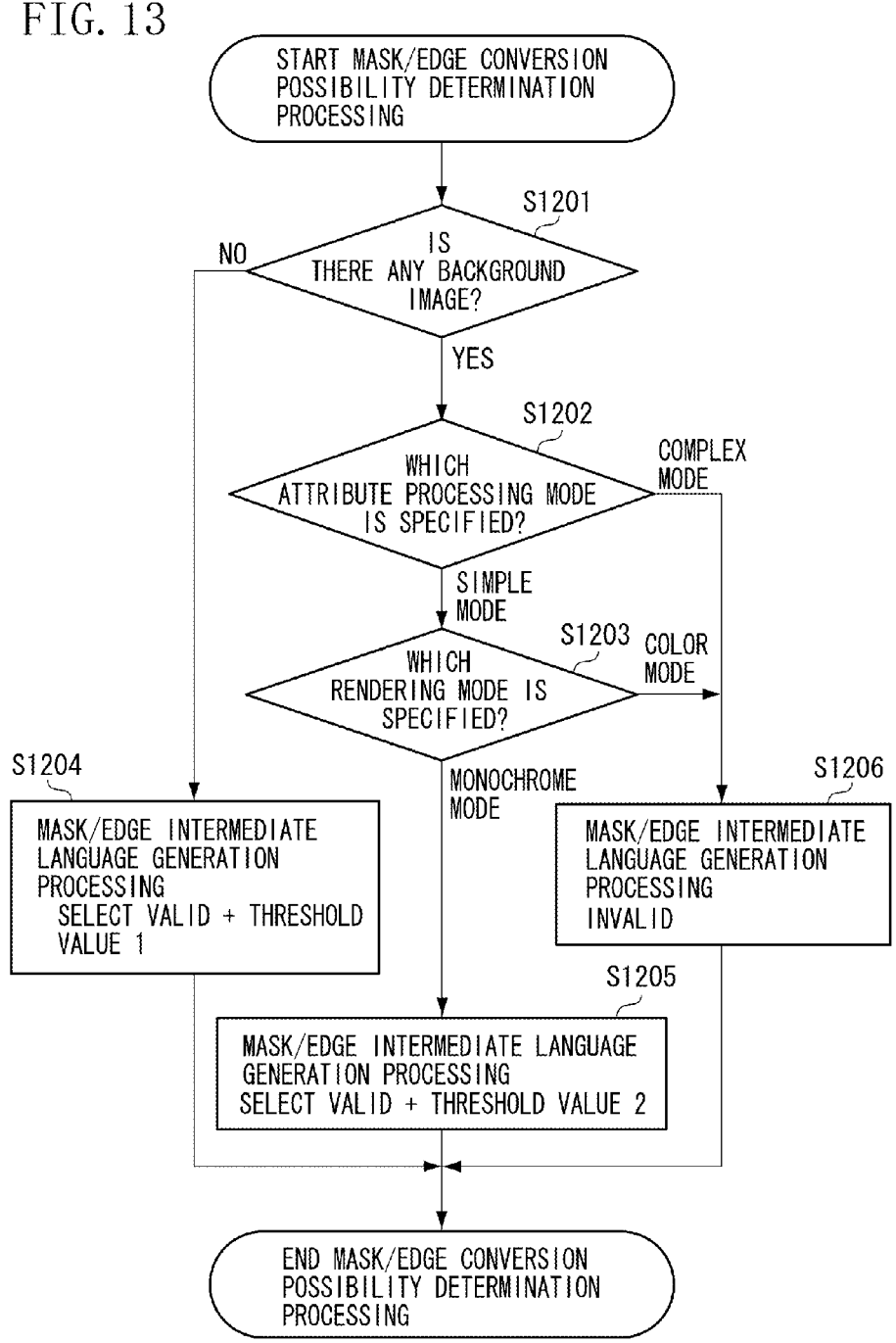
FIG. 13 is a flowchart illustrating a detailed example of mask/edge conversion possibility determination processing in step S1101.

FIG. 13 is a flowchart illustrating a detailed example of mask/edge conversion possibility determination processing in step S1101.

In step S1201, the CPU 111 determines whether there is any background image to be drawn over the whole page (e.g. the entire page) in the page. When there is a background image (YES in step S1201), the CPU 111 proceeds to step S1202. When there is no background image (NO in step S1201), the CPU 111 proceeds to step S1204. The CPU 111 determines whether there is any background image to be drawn over the whole page based on the flag information indicating, for example, that the fallback processing was performed on the page the previous time. The details are as described above. Since there is always a background image when the fallback processing is performed, the CPU 111 performs the determination based on the flag information indicating that the above-described fallback processing was performed on the page.

With this determination, depending on whether there is any background, the CPU 111 can determine whether the load of the mask drawing is large or small. Moreover, as another example of determining whether there is a background image, the CPU 111 determines whether there is a background image based on the object list 1500 of object information retained by the CPU 111. For example, based on the object list 1500 stored in the data storage unit 130, the CPU 111 performs the generation processing of the intermediate language.

The object list 1500 includes the object information 1501, 1502, and 1503, and the object filling information (single-color paint/image paint) 1504, 1505, and 1506. Therefore, the CPU 111 determines whether there is any background by searching the filling information 1504, 1505, and 1506 stored in the object list 1500 and analyzing information about the width and height included in the filling information 1504, 1505, and 1506. When there is an image having a larger width and height than that of the predetermined size, the CPU 111 determines that there is a background image.

In step S1202, the CPU 111 determines a specification of the attribute processing mode used for the page drawing. When a complex operational mode is specified for the attribute processing mode (COMPLEX MODE in step S1202), the CPU 111 proceeds to step S1206. When a simple operation mode is specified for the attribute processing mode (SIMPLE MODE in step S1202), the CPU 111 proceeds to step S1203. With this specification, according to the attribute processing mode, the optimum conversion can be performed on the mask drawing, which generates a different load for each pixel. An outline of the attribute processing is as described above.

In step S1203, the CPU 111 determines which mode of the color mode and the monochrome mode is to be used for the rendering mode. When the color mode is specified for the rendering mode (COLOR MODE in step S1203), the CPU 111 proceeds to step S1206. When the monochrome mode is specified for the rendering mode (MONOCHROME MODE in step S1203), the CPU 111 proceeds to step S1205. With this specification, according to the rendering mode, an optimum conversion can be performed on the mask drawing, which generates a different load for each pixel.

Next, according to the determination results of steps S1201, S1202, and S1203, the CPU 111 determines whether to perform the mask/edge intermediate language generation processing. When it is determined that the mask/edge intermediate language generation processing is to be validated, in steps S1204 and S1205, the CPU 111 also selects the threshold value. Further, when the processing proceeds to step S1206 according to the determination result of steps S1201 and S1202, in step S1206, the CPU 111 determines to invalidate the mask/edge intermediate language generation processing, so that the CPU 111 does not perform the mask/edge intermediate language generation processing in the subsequent processing.

Figure 14:
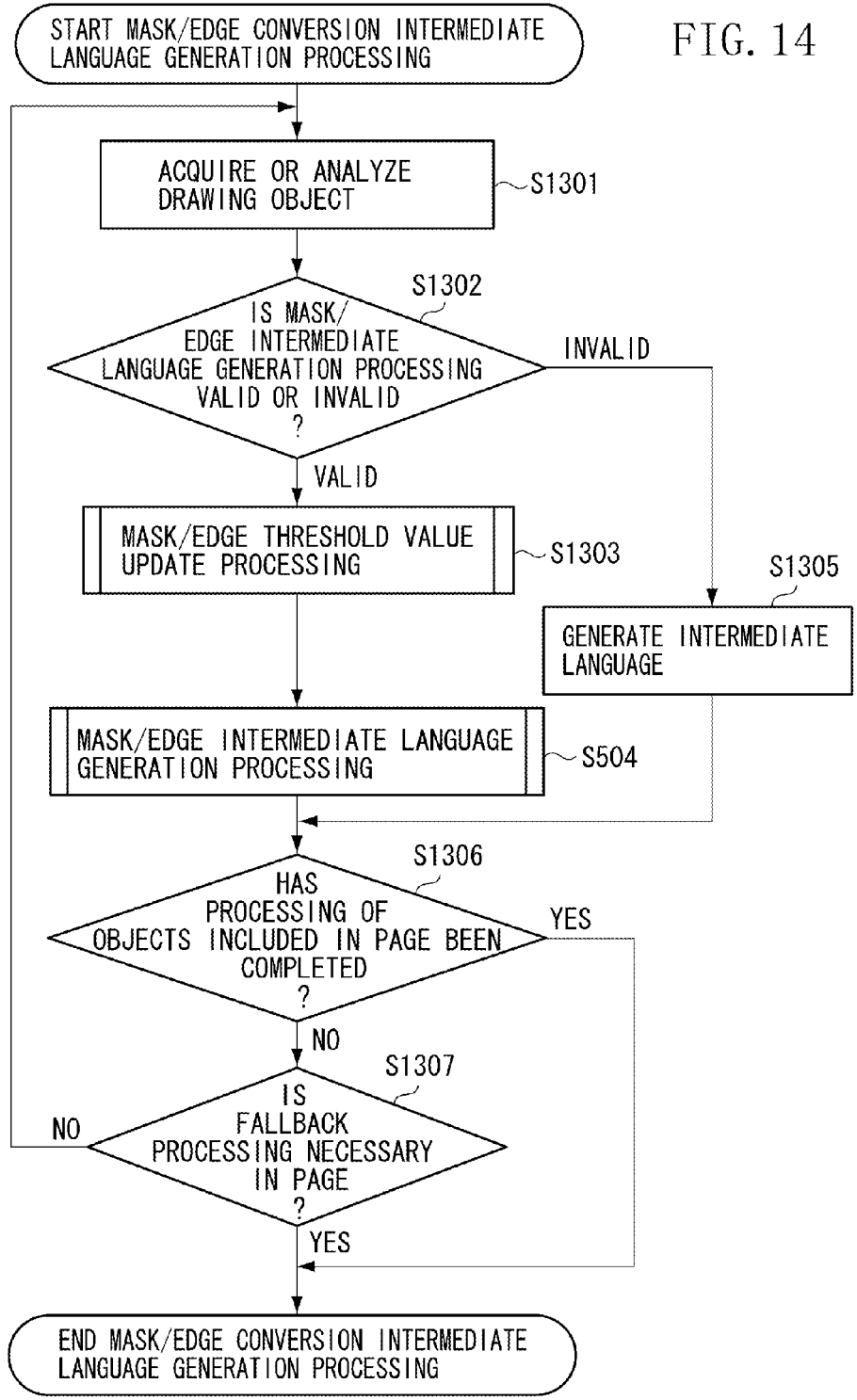
FIG. 14 is a flowchart illustrating a detailed example of mask/edge conversion intermediate language generation processing in step S1103.

FIG. 14 is a flowchart illustrating a detailed example of mask/edge conversion intermediate language generation processing in step S1103.

First, in step S1301, the CPU 111 performs processing for acquiring the drawing object included in the page and analyzing the drawing information related to the drawing object. In step S1302, the CPU 111 determines whether the mask/edge intermediate language generation processing is valid. When it is determined to be valid (VALID in step S1302) as the result of the determination, the CPU 111 proceeds to step S1302. When it is determined to be invalid (INVALID in step S1302) as the result of the determination, the CPU 111 proceeds to step S1305. Subsequently, in step S1303, the CPU 111 performs the mask/edge threshold value update processing.

In the mask edge threshold value update processing in step S1303, based on the characteristic of each drawing object, the CPU 111 determines whether the mask/edge conversion processing in the page is to be continued and whether the threshold value needs to be changed. Details thereof will be described below. In step S504, the CPU 111 performs the mask/edge intermediate language generation processing. The details are as described above and will not be repeated herein. In step S1305, the CPU 111 performs conventional intermediate language generation processing without performing the mask/edge intermediate language generation processing.

In step S1306, the CPU 111 determines whether the processing of the drawing object included in the page has been completed. When it is determined to be completed (YES in step S1306), then in step S1103, the CPU 111 ends the mask/edge conversion intermediate language generation processing. When it is not determined to be completed (NO in step S1306), the CPU 111 proceeds to step S1307.

In step S1307, the CPU 111 determines whether the fallback processing is necessary on the page. When the size of the generated intermediate language exceeds a capacity previously allocated to the data storage unit 130 (YES in step S1307), the CPU 111 determines that the fallback processing is necessary. When the size does not exceed the capacity (NO in step S1307), the CPU 111 determines that the fallback processing is not necessary, and then returns to step S1301 to continue a series of processing.

Figure 15:
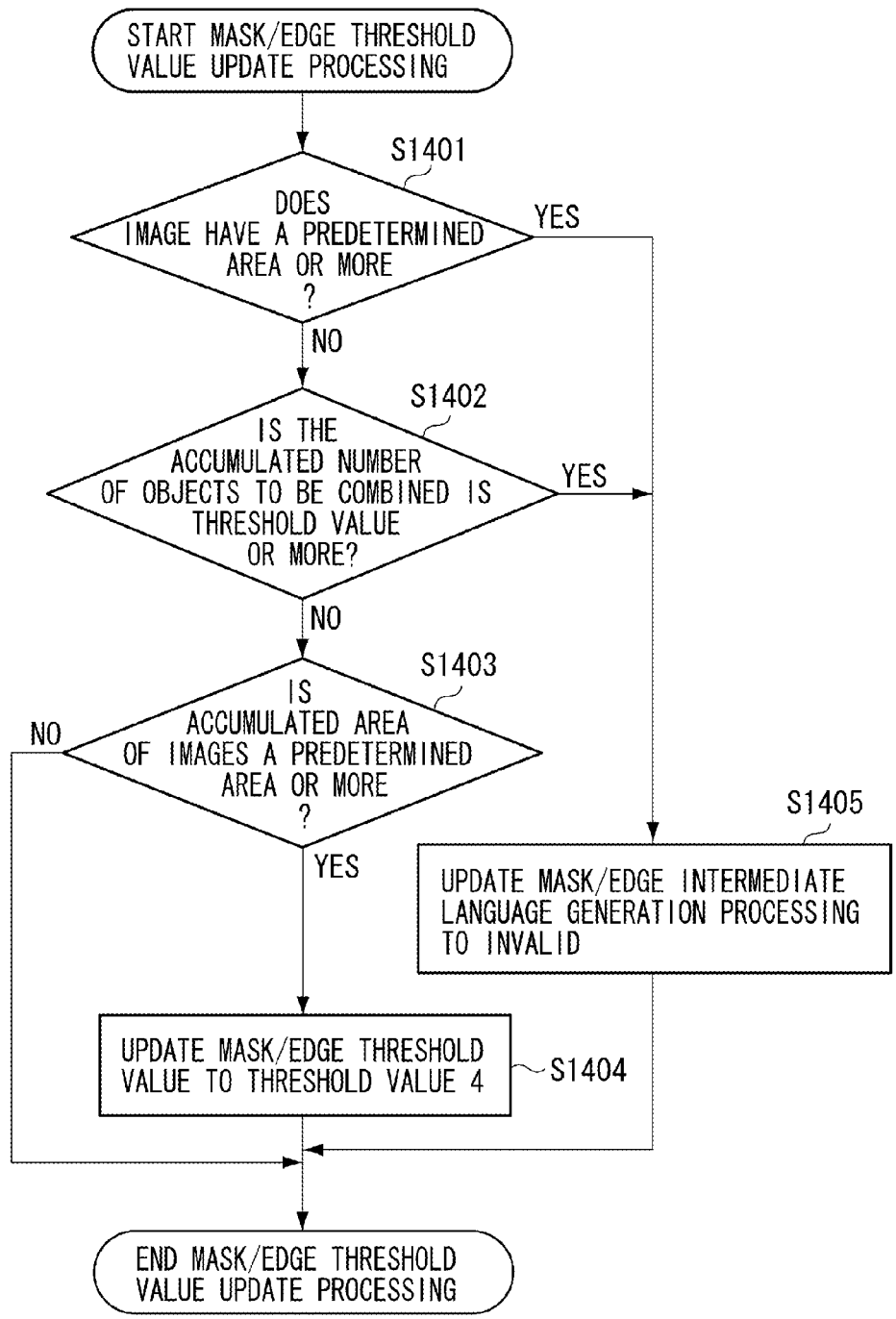
FIG. 15 is a flowchart illustrating a detailed example of mask threshold value update processing in step S1303.

FIG. 15 is a flowchart illustrating a detailed example of mask threshold value update processing in step S1303.

In step S1401, the CPU 111 determines whether the drawing object acquired in step S1301 is an image having a predetermined area or more. The CPU 111 determines the area of the background image based on the above-described object list 1500. When the intermediate language is generated, the CPU 111 sequentially refers to the items in the object list 1500 to generate each intermediate language.

Thus, the CPU 111 analyzes the width and height information of the filling information 1504, 1505, and 1506 about the object targeted for the processing, and determines whether the area has the predetermined area or more. When the image has the predetermined area or more, the CPU 111 determines that the image easily influences another object (due to increased preparation processing described with reference to FIG. 2). Therefore, when the condition described in step S1401 is satisfied (YES in step S1401), then in step S1405, the CPU 111 determines to invalidate the mask/edge intermediate language generation processing without performing it in the subsequent processing. When the condition in step S1401 is not satisfied (NO in step S1401), the CPU 111 proceeds to step S1402.

In step S1402, the CPU 111 performs processing for determining whether the number of accumulated objects that need combining processing is a predetermined number or more in the drawing objects acquired in step S502. The CPU 111 discriminates the ROP information related to each drawing object to determine whether the combining processing is necessary. Therefore, when the number of accumulated objects that need to be combined exceeds the predetermined number (YES in step S1402), then in step S1405, the CPU 111 updates the threshold value to be "INVALID", so that the CPU 111 does not perform the mask/edge intermediate language generation processing in the subsequent processing. Further, when it is determined that the number of accumulated objects does not exceed the predetermined number (NO in step S1402), the processing proceeds to step S1403.

In step S1403, the CPU 111 determines whether the area of accumulated images including the drawing objects acquired in step S502 is a predetermined area or more. The CPU 111 accumulates (adds) each area of the image, and determines whether the accumulated area exceeds the predetermined area. When the CPU 111 determines that the accumulated area has exceeded the predetermined area (YES in step S1403), the processing proceeds to step S1404. When the CPU 111 determines that the accumulated area does not exceed the predetermined area (NO in step S1403), the processing ends the mask/edge threshold value update processing.

In step S1404, according to the determination results in steps S1401 to S1403, the CPU 111 updates the mask/edge threshold value to the threshold value "4". An arbitrary value can be determined for the threshold value 4. However, the threshold value includes a coefficient facilitating the mask drawing in the order of threshold value 1>threshold value 4. Accordingly, the threshold value 1 facilitates the mask drawing most, and the threshold value 4 facilitates the edge drawing most.

As described above, according to each exemplary embodiment, the optimum drawing method that does not depend on a relationship among the drawing objects in the page and the specification of the processing can be selected, thereby further improving a drawing speed. According to the above-described exemplary embodiment, the examples using the threshold values are described. However, when the number of edges is larger than a predetermined number and the area is smaller than a predetermined area, the CPU 111 may select the mask drawing. When the number of edges is smaller than the predetermined number and the area is larger than the predetermined area, the CPU 111 may select the edge drawing.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-040519 filed Feb. 25, 2011, which is hereby incorporated by reference herein in its entirety.

What is claimed is:

1. An image forming apparatus comprising:
an acquisition unit configured to acquire a drawing object included in a page;
a determination unit configured to determine a threshold value, the threshold value being a first threshold value in a case where the acquired drawing object overlaps another drawing object included in the page or a second threshold value in a case where the acquired drawing object does not overlap another drawing object included in the page;
a selection unit configured to select, as a drawing method, one of a mask drawing and an edge drawing to draw the drawing object using the determined threshold value; and
a drawing unit configured to draw the acquired drawing object by the selected drawing method;
wherein the mask drawing tends to be selected by using the second threshold value more than the first threshold value.

2. The image forming apparatus according to claim 1, wherein the threshold value includes a coefficient "1" and a coefficient "2";
wherein, when "TRUE" is acquired from an expression of, (Width×Height)<Coefficient "1"×Number of Edges+ Coefficient "2"

the selection unit selects the mask drawing, and, when "FALSE" is acquired therefrom, the selection unit selects the edge drawing; and
wherein the "Width" indicates a width of a target object, the "Height" indicates a height of the target object, and the "Number of Edges" indicates a number of edges of the target object.

3. The image forming apparatus according to claim 1, wherein, depending on whether the acquired drawing object is an image having at least a predetermined area, the determination unit determines the threshold value.

4. The image forming apparatus according to claim 1, wherein, depending on whether the acquired drawing object needs to be combined and the number of accumulated objects that need to be combined exceeds a predetermined number, the determination unit determines the threshold value.

5. The image forming apparatus according to claim 1, wherein, depending on whether an area of accumulated images including the acquired drawing object exceeds a predetermined area, the determination unit determines the threshold value.

6. The image forming apparatus according to claim 1, further comprising a threshold value determination unit configured to determine the threshold value according to setting information about the page,
wherein, depending on whether the acquired drawing object overlaps another drawing object included in the page, the determination unit determines the threshold value determined by the threshold value by updating the threshold value determination unit.

7. The image forming apparatus according to claim 6, wherein, according to, as the setting information, information indicating whether there is any background image to be drawn over the whole page, the threshold value determination unit determines the threshold value.

8. The image forming apparatus according to claim 6, wherein, according to, as the setting information, information indicating whether a processing mode for calculating an output result of an attribute value when a background object and an object disposed thereon are combined with each other is a simple mode that does not need to analyze a combination of parameters or a complex mode that needs to analyze the combination of parameters, the threshold value determination unit determines the threshold value.

9. The image forming apparatus according to claim 6, wherein, according to, as the setting information, information indicating whether a rendering mode is a color mode or a monochrome mode, the threshold value determination unit determines the threshold value.

10. The image forming apparatus according to claim 1, further comprising a selection processing determination unit configured to determine, according to setting information about the page in which drawing is to be performed, whether to perform selection processing for allowing the selection unit to select one of the mask drawing and the edge drawing to draw the drawing object,
wherein, when the selection processing determination unit determines to perform the selection processing, the selection unit selects one of the mask drawing and the edge drawing to draw the drawing object.

11. The image forming apparatus according to claim 10, wherein, according to, as the setting information, information indicating whether there is any background image to be drawn over the whole page, the selection processing determination unit determines whether to perform the selection processing.

12. The image forming apparatus according to claim 10, wherein, according to, as the setting information, information indicating whether a processing mode for calculating an output result of an attribute value when a background object and an object disposed thereon are combined with each other is a simple mode performed by an AND operation or a complex mode that needs to analyze a combination of parameters, the selection processing determination unit determines whether to perform the selection processing.

13. The image forming apparatus according to claim 10, wherein, according to, as the setting information, information indicating whether a rendering mode is a color mode or a monochrome mode, the selection processing determination unit determines whether to perform the selection processing.

14. An image forming apparatus comprising:
an acquisition unit configured to acquire a drawing object included in a page;
a determination unit configured to determine whether the acquired drawing object is an object targeted for selecting a predetermined mask drawing or a predetermined edge drawing, on the basis of an attribute of the acquired drawing object;
a selection unit configured to select, as a drawing method, the predetermined mask drawing if the number of edges of the acquired drawing object is larger than a predetermined number, and to select, as the drawing method, the predetermined edge drawing if the number of edges of the acquired drawing object is not larger than the predetermined number;
a generation unit configured to generate on the basis of the acquired drawing object, if the acquired drawing object is determined in the determination to be the object targeted for the selecting, intermediate language data whose drawing method is the selected drawing method, and to generate on the basis of the acquired drawing object, if the acquired drawing object is determined in the determination not to be the object targeted for the selecting, intermediate language data without performing the selection; and a drawing unit configured to perform drawing based on the generated intermediate language data.

15. The image forming apparatus according to claim 14, wherein the selection unit selects either one of the predetermined mask drawing and the predetermined edge drawing, as a drawing method, the predetermined mask drawing if the number of edges of the acquired drawing object is larger than a predetermined number and an area of the acquired drawing object is smaller than a predetermined area, and selects, as the drawing method, the predetermined edge drawing if the number of edges of the acquired drawing object is not larger than the predetermined number and the area of the acquired drawing object is larger than the predetermined area.

16. A drawing method comprising:

acquiring a drawing object included in a page;

determining whether the acquired drawing object is an object targeted for selecting a predetermined mask drawing or a predetermined edge drawing, on the basis of an attribute of the acquired drawing object;

selecting, as a drawing method, the predetermined mask drawing if the number of edges of the acquired drawing object is larger than a predetermined number, and selecting, as the drawing method, the predetermined edge drawing if the number of edges of the acquired drawing object is not larger than the predetermined number;

generating, on the basis of the acquired drawing object, if the acquired drawing object is determined in the determination to be the object targeted for the selecting, intermediate language data whose drawing method is the selected drawing method, and generating on the basis of the acquired drawing object, if the acquired drawing object is determined in the determination not to be the object targeted for the selecting, intermediate language data without performing the selection; and drawing based on the generated intermediate language data.

17. A non-transitory computer-readable storage medium storing a program for causing a computer to execute a method, the method comprising:

acquiring a drawing object included in a page;

determining whether the acquired drawing object is an object targeted for selecting a predetermined mask drawing or a predetermined edge drawing, on the basis of an attribute of the acquired drawing object;

selecting, as a drawing method, the predetermined mask drawing if the number of edges of the acquired drawing object is larger than a predetermined number, and selecting, as the drawing method, the predetermined edge drawing if the number of edges of the acquired drawing object is not larger than the predetermined number;

generating, on the basis of the acquired drawing object, if the acquired drawing object is determined in the determination to be the object targeted for the selecting, intermediate language data whose drawing method is the selected drawing method, and generating on the basis of the acquired drawing object, if the acquired drawing object is determined in the determination not to be the object targeted for the selecting, intermediate language data without performing the selection; and drawing based on the generated intermediate language data.

\* \* \* \* \*